(12) United States Patent
Larsen

(10) Patent No.: US 7,455,807 B2
(45) Date of Patent: *Nov. 25, 2008

(54) CONTINUOUS PRODUCTION OF MOLDED PLASTIC CONTAINERS

(75) Inventor: W. Bruce Larsen, Holland, OH (US)

(73) Assignee: Graham Packaging PET Technologies Inc., York, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/751,164

(22) Filed: May 21, 2007

(65) Prior Publication Data

US 2007/0228620 A1  Oct. 4, 2007

Related U.S. Application Data

(63) Continuation of application No. 11/430,078, filed on May 8, 2006, now Pat. No. 7,220,379, which is a continuation of application No. 10/716,229, filed on Nov. 17, 2003, now Pat. No. 7,052,644.

(51) Int. Cl.
*B29C 49/02* (2006.01)

(52) U.S. Cl. .................. 264/531; 264/532; 264/543; 425/528; 425/534

(58) Field of Classification Search .................. 264/531, 264/532, 543; 425/528, 534
See application file for complete search history.

(56) References Cited

U.S. PATENT DOCUMENTS

| | | | |
|---|---|---|---|
| 3,409,939 A | 11/1968 | Hey | |
| 3,661,489 A | 5/1972 | Moore | |
| 4,327,052 A | 4/1982 | Sauer | |
| 4,660,801 A | 4/1987 | Schad | |
| 4,836,971 A | 6/1989 | Denis et al. | |
| 5,308,233 A | 5/1994 | Denis et al. | |
| 5,683,729 A | 11/1997 | Valles | |

(Continued)

FOREIGN PATENT DOCUMENTS

EP  1306195 A  5/2003

(Continued)

OTHER PUBLICATIONS

International Search Report mailed Mar. 18, 2005 in corresponding PCT Application No. PCT/US2004/038493.

*Primary Examiner*—Robert B Davis
(74) *Attorney, Agent, or Firm*—Rissman, Jobse, Hendricks & Oliverio LLP

(57) ABSTRACT

A system for making plastic containers includes a source for providing a continuous stream of molten plastic, and a cutter for severing a continuing series of individual mold charges from the continuous molten plastic stream. A compression molder includes a plurality of compression molds arranged in a continuing series for receiving the mold charges in sequence and compression molding the mold charges into a continuing series of individual plastic container preforms. A blow molder includes a plurality of blow molds arranged in a continuing series for receiving the individual plastic container preforms in sequence and blow molding the preforms into a continuing series of plastic containers. A common drive coordinates continuous and synchronous operation of the molten plastic source, the cutter, the compression molder and the blow molder to provide the continuing series of plastic containers from the continuous stream of molten plastic.

23 Claims, 1 Drawing Sheet

U.S. PATENT DOCUMENTS

| | | |
|---|---|---|
| 5,863,571 A | 1/1999 | Santis et al. |
| 5,996,322 A | 12/1999 | La Barre |
| 6,053,723 A | 4/2000 | Guiffant et al. |
| 6,113,834 A | 9/2000 | Kozai et al. |
| 6,139,789 A | 10/2000 | Neter et al. |
| 6,168,749 B1 | 1/2001 | Koch |
| 6,217,819 B1 | 4/2001 | Wunderlich |
| 6,298,638 B1 | 10/2001 | Bettle |
| 6,349,838 B1 | 2/2002 | Saito et al. |
| 6,423,253 B1 | 7/2002 | Bunel et al. |
| 6,716,386 B2 | 4/2004 | Saito et al. |
| 7,052,644 B2 * | 5/2006 | Larsen .............. 264/531 |
| 7,220,379 B2 * | 5/2007 | Larsen .............. 264/531 |
| 2002/0088767 A1 | 7/2002 | Saito et al. |
| 2003/0146549 A1 | 8/2003 | Dunlap et al. |

FOREIGN PATENT DOCUMENTS

| | | |
|---|---|---|
| WO | WO 00/29188 A | 5/2000 |

\* cited by examiner

CONTINUOUS PRODUCTION OF MOLDED PLASTIC CONTAINERS

The present invention is directed to blow molding plastic containers, and more particularly to a system and method for continuous production of plastic containers from polymer in melt phase.

BACKGROUND AND SUMMARY OF THE INVENTION

Preforms for blow molding plastic containers typically are produced in batch processes, in which one or more solid phase polymers such as polyethylene terephthalate (PET) are melted and injected into preform molds. The injection molded preforms are blow molded to form plastic containers, usually at some later time. A general object of the present invention is to provide a system and method for continuous production of blow molded plastic containers from molten polymer.

A system for making plastic containers in accordance with one presently preferred aspect of the invention includes a source for providing a continuous stream of molten plastic, and a cutter for severing a continuing series of individual mold charges from the continuous molten plastic stream. A compression molder includes a plurality of compression molds arranged in a continuing series for receiving the mold charges in sequence and compression molding the mold charges into a continuing series of individual plastic container preforms. A blow molder includes a plurality of blow molds arranged in a continuing series for receiving the individual plastic container preforms in sequence and blow molding the preforms into a continuing series of plastic containers. A common drive coordinates continuous and synchronous operation of the molten plastic source, the cutter, the compression molder and the blow molder to provide the continuing series of plastic containers from the continuous stream of molten plastic.

A method of making plastic containers in accordance with another aspect of the present invention includes providing a continuous stream of molten plastic, cutting the continuous stream into individual mold charges, and transferring the mold charges in sequence into a continuing series of compression molds. A continuing series of plastic container preforms are compression molded in the compression molds, and are transferred in sequence to a continuing series of blow molds. A continuing series of plastic containers is formed in the blow molds and removed in sequence. The step of transferring the preforms to the blow molds preferably includes conditioning the preforms preparatory to blow molding.

A system for making plastic containers in accordance with a third presently preferred aspect of the invention includes a source for providing a continuous stream of molten plastic, and a compression or injection molder for molding a continuing series of individual plastic container preforms. A blow molder includes a plurality of blow molds arranged in a continuing series for receiving the individual plastic container preforms in sequence and blow molding the preforms into a continuing series of plastic containers. A common drive coordinates continuous and synchronous operation of the molten plastic source, the preform molder and the blow molder to provide the continuing series of plastic containers from the continuous stream of molten plastic.

BRIEF DESCRIPTION OF THE DRAWING

The invention, together with additional objects, features, advantages and aspects thereof, will be best understood from the following description, the appended claim and the accompanying drawing, which is a schematic diagram of a system for making plastic containers in accordance with one presently preferred embodiment of the invention.

DETAILED DESCRIPTION OF PREFERRED EMBODIMENTS

Figure 1:
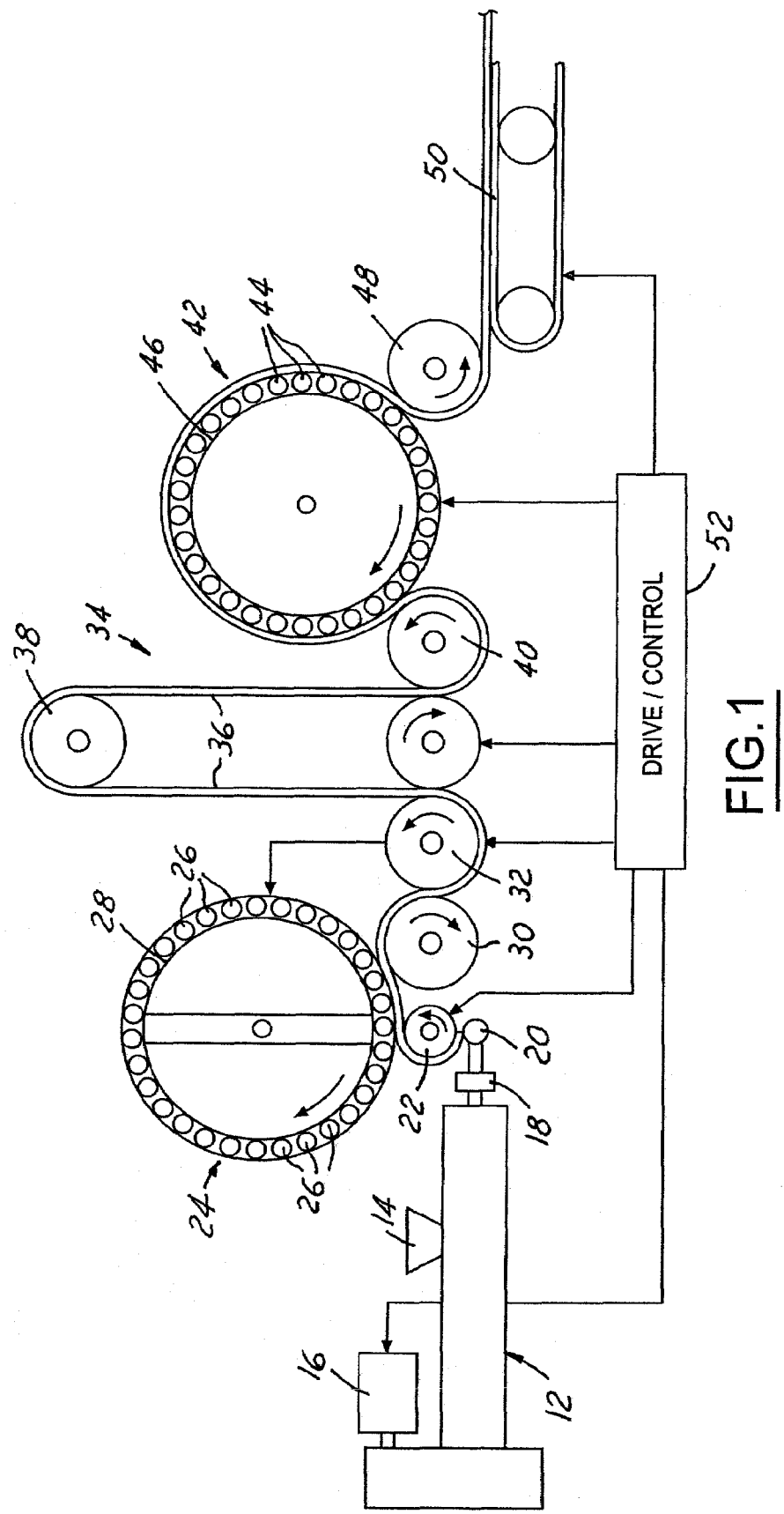

The drawing illustrates a system 10 for making plastic containers in accordance with a presently preferred embodiment of the invention. An extruder 12 receives one or more plastic resin materials from associated hoppers 14. Extruder 12 is driven by a motor 16 to provide a continuous stream of plastic resin material in melt phase to an extrusion nozzle 18. The plastic resin material may comprise molten PET, for example, to fabricate containers of monolayer PET construction. As an alternative, multiple extruders 12 can feed associated streams of molten plastic material to nozzle 18, with nozzle 18 being constructed to provide a continuous stream of layered resin material for fabrication of multilayer containers. Such containers may have inner and outer surface layers of PET construction, for example, and one or more intermediate layers of barrier material, such as ethylene vinyl alcohol (EVOH) or nylon, to retard migration of gas, water vapor and/or flavorants through the container wall. As another alternative, extruder 12 can be replaced by a reactor within which the resin material, such as PET, is produced by melt phase polymerization.

The continuous stream of molten plastic resin is fed to a pellet cutter 20 and a transfer mechanism 22 for severing a continuing series of individual mold charges from the continuous stream of plastic resin, and transferring the mold charges to individual molds 26 of a compression molder 24. Compression molder 24 preferably includes a plurality of compression molds 26 arranged in a continuous series for receiving the mold charge pellets in sequence and compression molding the mold charge pellets into a continuing series of individual plastic container preforms. The compression molds 26 preferably are carried by a rotatable turret 28, which is driven in synchronism with rotation of cutter 20 and transfer mechanism 22. Compression molder 24, transfer mechanism 22 and cutter 20 may be as disclosed in U.S. Pat. Nos. 5,866,177 or 6,349,838, for example, the disclosures of which are incorporated herein by reference.

After the preforms have been compression molded and cooled sufficiently to retain their shape, the preforms are individually removed from molds 26 and transferred by wheels or other suitable transfer devices 30, 32 to a conditioning stage 34. At conditioning stage 34, the preforms are fed in a loop 36 around a wheel 38, and then back to a preform transfer wheel 40. During travel in loop 36, the preforms are allowed to cool from the temperature at which they exit compression molder 24 to a temperature suitable for blow molding. For example, PET preforms may be withdrawn from compression molder 24 at a temperature of about 280 to 300° F., and allowed to cool at conditioning stage 34 to a temperature of 210 to 220° F. suitable for blow molding. Conditioning stage 34 may also include selective heating to obtain a temperature profile in the preform suitable for blow molding, and may include crystallization of portions of the preform, such as the preform finish. Conditioning stage 34 may comprise a rotating wheel or turret, or an extended conveyor loop along which the preforms are carried.

After preform conditioning at stage 34, the preforms are transferred to a blow molder 42 by the wheel, turret or other suitable transfer device 40. Blow molder 42 includes a continuing series of blow molds 44 mounted on a turret or the like 46 for receiving the preforms in sequence, and blow molding the preforms into containers of desired geometry. (Reference to compression molding or blow molding preforms or containers "in sequence" does not mean that the preforms or containers are formed one at a time. Indeed, compression molder 24 and/or blow molder 42 preferably includes facility for compression molding or blow molding multiple preforms and containers at each mold stage.) Blow molder 42 may be of the type disclosed in U.S. Pat. Nos. 5,683,729, 5,863,571 and 6,168,749, the disclosures of which are incorporated herein by reference. Following blow molding, the containers are transferred by a wheel, turret or other suitable device 48 to a conveyor 50 for moving the containers to subsequent manufacturing stages, such as labeling (decorating), filling, capping and crating stages. As an alternative, the subsequent stages may be linked directly to blow molder 42 to form an integrated sequential system.

Additional stages may be added for operating on the finish of the preform or container. For example, the finish can be crystallized, as illustrated for example in U.S. application Ser. No. 10/122,901 filed Apr. 12, 2002. As another example, finish rings can be added to the finish neck prior to or subsequent to blow molding, as disclosed for example in U.S. application Ser. Nos. 10/375,737, 10/403,415, 10/375,736, 10/351,671 and 10/375,758. Other forms of finish manipulation could be implemented.

A common or integrated drive/control mechanism 52 is connected to the drive 16 of extruder 12, the drive of cutter 20 and transfer wheel 22, the drive of compression molder turret 28, the drive of conditioning stage 34, the drive of blow molder turret 46, to the drive of conveyor 50 and the drives of the various transfer devices to operate and control these drive mechanisms continuously and in synchronism for continuous production of containers at the output of blow molder 42 from a continuous stream of molten plastic at the output of extruder 12. Drive/control mechanism 52 may comprise servo control electronics for synchronizing operation of servo motors connected to extruder 12, compression molder 28, conditioning stage 34, blow molder 42 and conveyor 50. As an alternative, drive/control 52 may comprise a single motor that is connected by suitable drive mechanisms, such as belts, gears or chains, to the operating mechanisms of the extruder, compression molder, conditioner, blow molder and conveyor. In either event, the extruder, preform compression molder, preform conditioner, container blow molder and conveyor are operated continuously and synchronized with each other for continuous production of containers from the molten output of the extruder.

There have thus been disclosed a system and method for making plastic containers that fully satisfy all of the objects and aims previously set forth. The system and method of the invention possess a number of advantages over the prior art, including but not limited to: (1) Reduced intrinsic viscosity (IV) loss in the preform, yielding better part quality and the opportunity to use lower cost material. (2) Reduced energy required because the preform does not need to be reheated from room temperature prior to blow molding. (3) Reduced cost of customizing the system to permit addition of modules for finish manipulation, finish crystallization, container decoration, filling and capping, etc. The invention has been described in conjunction with one presently preferred embodiment, and a number of modifications and variations have been discussed. Other modifications and variations will readily suggest themselves to persons of ordinary skill in the art. The invention is intended to embrace all such modifications and variations as fall within the spirit and broad scope of the appended claims.

The invention claimed is:

1. A system for making plastic containers, which includes:
a source for providing a continuous stream of molten plastic,
a compression preform molder including a turret carrying a plurality of compression molds for receiving a continuous series of mold charges in sequence cut from said stream and compression molding the charges into a continuing series of individual plastic container preforms,
a preform conditioner connected between said compression molder and a blow molder for conditioning performs from said compression molder preparatory to blow molding in a blow molder,
a blow molder including a turret carrying a plurality of blow molds arranged in a continuing series for receiving said individual plastic container preforms in sequence and blow molding said preforms into a continuing series of plastic containers, and
a common drive connected to and coordinating continuous and synchronous operation of said source, said compression molder, said perform conditioner and said blow molder.

2. The system set forth in claim 1 wherein said common drive includes a drive/control mechanism connected to a drive of said source, a drive of said compression molder, a drive of said preform conditioner, and a drive of said blow molder.

3. The system set forth in claim 2 wherein said drive/control mechanism includes servo control electronics for synchronizing operation of servo motors connected to said source, said compression molder, said preform conditioner, and said blow molder.

4. The system set forth in claim 2 wherein said drive/control mechanism comprises a single motor connected by drive mechanisms to operating mechanisms of said source, said compression molder, said preform conditioner, and said blow molder.

5. The system set forth in claim 1 wherein said source comprises an extruder which provides said continuous stream.

6. The system set forth in claim 1 wherein said preform conditioner comprises a conveyor loop or rotating turret around which said preforms travel and wherein said common drive is connected to and coordinates continuous and synchronous operation of said preform conditioner conveyor loop or rotating turret.

7. The system set forth in claim 1 further including a transfer device connected to said preform conditioner for conveying said conditioned preforms to said blow molder, and wherein said common drive is also connected to and coordinates continuous and synchronous operation of said transfer device.

8. The system set forth in claim 1 further including a conveyer connected to said blow molder for receiving said continuing series of plastic containers from said blow molder, and wherein said common drive is also connected to and coordinates continuous and synchronous operation of said conveyer.

9. The system set forth in claim 1 wherein said compression molder molds multiple performs at each mold stage.

10. The system set forth in claim 1 wherein said blow molder molds multiple containers at each mold stage.

11. The system set forth in claim 1 including a cutter for severing a continuing series of individual mold charges from said continuous stream, and wherein said common drive is connected to and coordinates continuous and synchronous operation of said cutter.

12. A method of making plastic containers, which includes the steps of:
   (a) providing a continuous stream of molten plastic,
   (b) compression molding said plastic into a continuing series of plastic container preforms, said compression molding being performed on a turret carrying a plurality of compression molds for receiving a continuous series of mold charges in sequence cut from said stream and compression molding the charges into said continuous series of preforms,
   (c) transferring said continuing series of plastic container preforms in sequence to a continuing series of blow molds, wherein said transferring step includes conditioning said plastic container performs preparatory to blow molding in said step (d),
   (d) blow molding a continuing series of plastic containers in said blow molds, wherein said blow molder includes a turret carrying said plurality of blow molds,
   (e) removing said containers in sequence from said blow molds, and
   (f) operating said steps (a) through (e) in synchronism to provide a continuing series of blow molded containers from said molten plastic stream.

13. The method set forth in claim 12 wherein said conditioning comprises transporting said preforms on a conveyor loop or rotating turret to obtain a temperature profile suitable for blow molding.

14. The method set forth in claim 12 that includes at least one step, prior to said step (c) or subsequent to said step (e), selected from the group consisting of:
   crystallizing all or a portion of a finish of the preform or container, and attaching all or a portion of a finish to the preform or container.

15. The method set forth in claim 12 that includes the step of attaching a label to the container during or subsequent to said step (d).

16. The method set forth in claim 12 wherein after said step (d) the preforms are transferred to a conditioning stage where they are allowed to cool to a temperature suitable for blow molding.

17. The method set forth in claim 16 wherein said step (f) includes operating said steps (a) through (e) in synchronism with said conditioning step.

18. The method set forth in claim 12 wherein during step (c) the preforms are heated to a temperature suitable for blow molding.

19. The method set forth in claim 12 wherein during said step (b) multiple preforms are compression molded in a single mold cycle.

20. The method set forth in claim 12 wherein during said step (d) multiple containers are blow molded in a single mold cycle.

21. The method set forth in claim 12 wherein said step (f) of operating in synchronism comprises connecting a common or integrated drive/control mechanism to a drive of an extruder for providing said continuous stream of molten plastic, a drive of the compression molding turret for said step of compression molding of said preforms, a drive of a transfer device for said step of transferring of said preforms to said blow molds, a drive of the blow molder turret carrying said blow molds, and a drive of a conveyer for said step of removing said containers from said blow molds.

22. The method of claim 12 including the step of cutting such continuous stream into individual mold charges and transferring said mold charges in sequence to a continuing series of compression molds for said step of compression molding, and wherein said operating step (f) includes operating said cutting step in synchronism with steps (a) through (e).

23. The method set forth in claim 12 wherein the continuous stream of molten plastic is fed to a cutter and transfer mechanism for severing a continuing series of individual mold charges from said stream and transferring the mold charges into individual compression molds carried by the turret which is operated in synchronism with the cutter and the transfer mechanism.

* * * * *

UNITED STATES PATENT AND TRADEMARK OFFICE
CERTIFICATE OF CORRECTION

PATENT NO. : 7,455,807 B2  Page 1 of 1
APPLICATION NO. : 11/751164
DATED : November 25, 2008
INVENTOR(S) : Larsen It is certified that error appears in the above-identified patent and that said Letters Patent is hereby corrected as shown below:

In claim 1, line 20, the following word should be corrected as follows:
"perform" to "preform"

In claim 6, line 5 should be corrected to include a comma as follows:
chronous operation of said preform conditioner, conveyor In claim 9, line 2, the following word should be corrected as follows:
"perform" to "preform"

In claim 12, section (c), line 4, the following word should be corrected as follows:
"perform" to "preform"

Signed and Sealed this

Seventh Day of April, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,455,807 B2  Page 1 of 1
APPLICATION NO. : 11/751164
DATED : November 25, 2008
INVENTOR(S) : Larsen It is certified that error appears in the above-identified patent and that said Letters Patent is hereby corrected as shown below:

Column 4, in claim 1, line 25, the following word should be corrected as follows: "perform" to "preform"

Column 4, in claim 6, line 48, should be corrected to include a comma as follows: chronous operation of said preform conditioner, conveyor Column 4, in claim 9, line 63, the following word should be corrected as follows: "perform" to "preform"

Column 5, in claim 12, line 18, the following word should be corrected as follows: "perform" to "preform"

This certificate supersedes the Certificate of Correction issued April 7, 2009.

Signed and Sealed this

Twenty-eighth Day of April, 2009

JOHN DOLL
*Acting Director of the United States Patent and Trademark Office*